(12) United States Patent
Greene et al.

(10) Patent No.: US 7,934,606 B2
(45) Date of Patent: May 3, 2011

(54) INDUCED VORTEX PARTICLE SEPARATOR

(75) Inventors: Boyd B. Greene, Byhalia, MS (US); Helen C. Greene, Germantown, TN (US)

(73) Assignee: Advanced Petroleum Technologies, Inc., Byhalia, MS (US)

( * ) Notice: Subject to any disclaimer, the term of this patent is extended or adjusted under 35 U.S.C. 154(b) by 612 days.

(21) Appl. No.: 12/078,168

(22) Filed: Mar. 27, 2008

(65) Prior Publication Data

US 2008/0290023 A1 Nov. 27, 2008

Related U.S. Application Data

(60) Provisional application No. 60/924,668, filed on May 24, 2007.

(51) Int. Cl.
*B01D 21/26* (2006.01)

(52) U.S. Cl. ............ 210/512.1; 210/788; 209/715; 209/723; 209/725; 209/727; 209/733; 96/209; 55/459.1; 55/459.2; 55/459.3; 55/459.4

(58) Field of Classification Search .......... 210/512.1, 210/788; 209/715, 723, 725, 727, 733; 96/209; 55/459.1, 459.2, 459.3, 459.4
See application file for complete search history.

(56) References Cited

U.S. PATENT DOCUMENTS

| | | | |
|---|---|---|---|
| 360,441 A | 4/1887 | Howes | |
| 453,105 A | 5/1891 | Bretney | |
| 2,346,005 A * | 4/1944 | Bryson | 210/512.1 |
| 3,784,009 A | 1/1974 | Maciula | |
| 3,802,570 A | 4/1974 | Dehne | |
| 4,838,434 A | 6/1989 | Miller et al. | |
| 4,865,751 A | 9/1989 | Smisson | |
| 5,273,647 A | 12/1993 | Tuszko et al. | |
| 5,391,294 A | 2/1995 | Mercier | |
| 5,453,196 A | 9/1995 | Tuszko et al. | |
| 6,149,825 A | 11/2000 | Gargas | |
| 6,210,575 B1 | 4/2001 | Chase et al. | |
| 6,238,579 B1 | 5/2001 | Paxton et al. | |
| 6,294,001 B1 | 9/2001 | Hyppanen et al. | |
| 6,596,170 B2 | 7/2003 | Tuszko et al. | |
| 6,818,034 B2 | 11/2004 | Anderson et al. | |
| 7,067,065 B2 | 6/2006 | Schloss | |
| 7,166,230 B2 | 1/2007 | Nilsen et al. | |

FOREIGN PATENT DOCUMENTS

GB 506488 5/1939

* cited by examiner

*Primary Examiner* — David A Reifsnyder
(74) *Attorney, Agent, or Firm* — Richard C. Litman

(57) ABSTRACT

The induced vortex particle separator is a device for separating solid particulate matter from a liquid containing such particulate matter. The liquid enters a housing through an inlet port and is driven about a helical vane to form a helical flow path. Upon exiting the helical vane, the liquid is received within a central portion of the housing where a centralized structure including an annular stator and an inverted diffuser cone drive the liquid to form a free vortex. Under centrifugal force, the solid particulate matter is separated from the liquid and flows, under the force of gravity, into a lower region of the housing. Due to a negative pressure differential, the liquid is driven upwards within an inner cylindrical shell mounted within the housing to flow into a siphon for output through an outlet port.

16 Claims, 3 Drawing Sheets

INDUCED VORTEX PARTICLE SEPARATOR

CROSS-REFERENCE TO RELATED APPLICATION

This application claims the benefit of U.S. Provisional Patent Application Ser. No. 60/924,668, filed May 24, 2007.

BACKGROUND OF THE INVENTION

1. Field of the Invention

The present invention relates to centrifugal particle separators, and particularly to an induced vortex particle separator in which solid particulate matter is separated from a liquid through the inducement of a free vortex within the liquid.

2. Description of the Related Art

Solid particulate matter suspended in a liquid is commonly removed from the liquid through use of a hydroclone or cyclone type separator. In such a separator system, the fluid is driven into a forced-vortex path, with centrifugal forces driving the relatively heavy-density particulate matter to the wall of the separator, similar in action to a centrifuge. Such systems typically include some sort of filtering apparatus located against the wall of the separator for collecting the particulate matter.

Such filters or collectors, however, must be removed from the separator and separately cleaned, which can be a messy and laborious process. Further, such systems are ineffective in removing fine particulate matter, which may remain suspended in the liquid. By the fluid dynamic nature of the forced vortex, the particulate matter only migrates towards a region where it can be easily removed and collected when there is a substantial difference in densities between the particulate matter and the liquid.

A free or irrotational vortex is a non-forced vortex. Such vortices are typically found in weather patterns and drainage systems; i.e., the vortex generated by the Coriolis Effect is a free vortex. Such free vortices have pressure variations in the fluid flow which are dependent upon the radius within the vortex. A forced vortex separator, such as a hydroclone separator, is not capable of taking advantage of these effects to aid in the removal of fine particulate matter. It would be desirable to provide a cyclonic or vortex-type particle separator that takes advantage of the free vortex properties. Thus, an induced vortex particle separator solving the aforementioned problems is desired.

SUMMARY OF THE INVENTION

The induced vortex particle separator includes a housing having a substantially cylindrical sidewall, and closed upper and lower ends. The housing is divided into an upper region, a central region and a lower region, with an inlet port being formed through the upper region of the housing and an outlet port being formed through the lower region of the housing.

An inner cylindrical shell having a diameter associated therewith which is less than a diameter of the substantially cylindrical sidewall of the housing is mounted to the closed upper end of the housing and is positioned coaxially therewith. The inner cylindrical shell extends between the closed upper end and the central region of the housing. A helical vane is mounted to an outer surface of the inner cylindrical shell and an inner surface of the substantially cylindrical sidewall, with the helical vane extending therebetween.

An annular stator is mounted to the inner surface of the substantially cylindrical sidewall within the central region of the housing, with the annular stator defining a central opening, and having at least one flow passage defined therethrough. An inverted diffuser cone is mounted within the central opening of the annular stator and extends upwardly therefrom. The inverted diffuser cone has a central passage formed therethrough.

Further, a siphon nozzle having an open upper end, an open lower end, and a central portion is provided, with the central portion thereof being received within the central passage of the inverted diffuser cone such that the open upper end of the siphon nozzle is positioned within a lower end of the inner cylindrical shell. The open lower end of the siphon nozzle is joined to the outlet port of the housing.

A collector ring having a central passage formed therethrough is mounted to the siphon nozzle with the siphon nozzle projecting through the central passage. The collector ring is mounted above the inverted diffuser cone.

In operation, liquid containing particulate matter is input into the induced vortex particle separator through the inlet port. The liquid is induced into a helical flow path by the helical vane, and a free vortex region is formed between the annular stator, an outer surface of the inverted diffuser cone, a lower end of the inner cylindrical shell, a lower surface of the collector ring and the inner surface of the substantially cylindrical sidewall. Within the free vortex formed in the liquid, particulate matter is separated from the liquid under centrifugal force.

Relatively high density particulate matter achieves the greatest diameter in the vortex path and settles adjacent the inner surface of the housing. Particulate matter having a lower density is deflected by the outer surface of the inverted diffuser cone, and both streams of particulate matter (and some remaining liquid) pass through the at least one flow passage of the annular stator, under the force of gravity. The particulate matter (and some liquid) collects within the lower region of the housing for later retrieval and disposal thereof. The liquid flows into the lower end of the inner cylindrical shell due to the fluid pressure in this region being less than that within the free vortex region, and then passes into the siphon nozzle to be selectively expelled through the outlet port.

Preferably, a sludge drainage port is formed through the closed lower end of the housing, and a drainage nozzle is mounted to an exterior surface of the housing, with the drainage nozzle covering and selectively sealing the sludge drainage port. A secondary annular stator may be mounted to the inner surface of the substantially cylindrical sidewall, within the lower region of the housing. A secondary diffuser cone is mounted within the stator, similar to the primary stator and diffuser cone described above.

These and other features of the present invention will become readily apparent upon further review of the following specification and drawings.

DETAILED DESCRIPTION OF THE PREFERRED EMBODIMENTS

Figure 1:
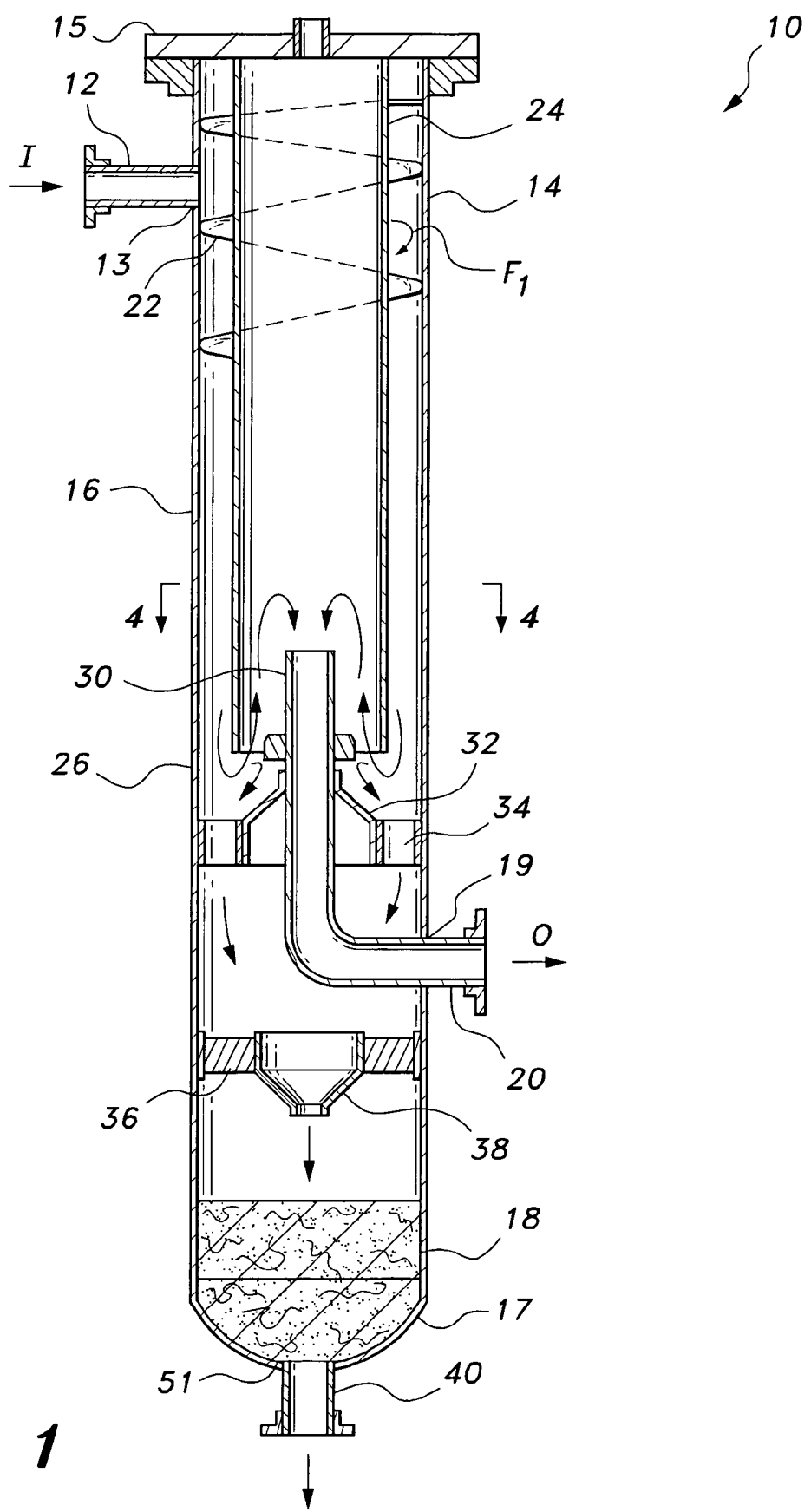
FIG. 1 is a side view in section of an induced vortex particle separator according to the present invention.
Figure 2:
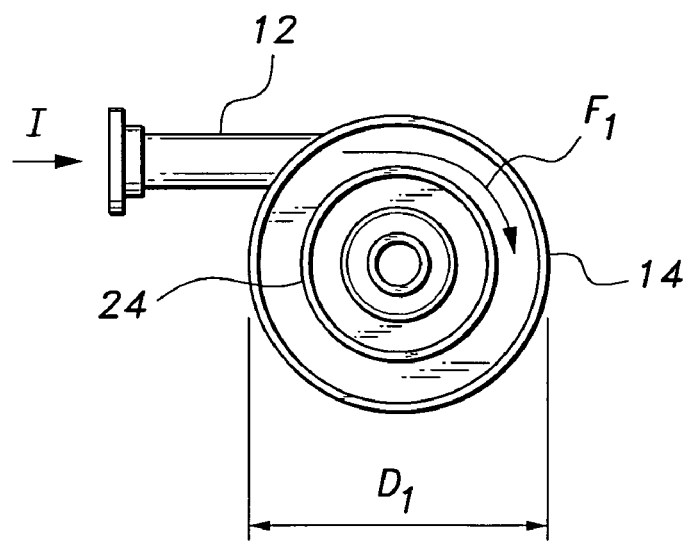
FIG. 2 is a diagrammatic top view of the induced vortex particle separator according to the present invention.

The present invention is directed towards an induced vortex particle separator 10. As shown in FIG. 1, the induced vortex particle separator 10 includes a housing 14 having a substantially cylindrical sidewall, and closed upper and lower ends 15, 17, respectively. The housing 14 is divided into an upper region 16, a central region 26 and a lower region 18. An inlet port 13 is formed through the upper region 16 of the housing 14, and an outlet port 19 is formed through the lower region 18 of the housing 14. An inlet nozzle 12, shown in FIGS. 1 and 2, is mounted to housing 14 and covers inlet port 13 for selective insertion of fluid therethrough. Similarly, an outlet or discharge nozzle 20 covers outlet port 19, for selective expulsion of liquid therethrough, as will be described in greater detail below. Preferably, the housing 14 has a diameter of $D_1$ and the height of housing 14 is at least $6D_1$. Discharge nozzle 20 is preferably positioned at least $4D_1$ from the upper end 15 of housing 14.

Figure 3:
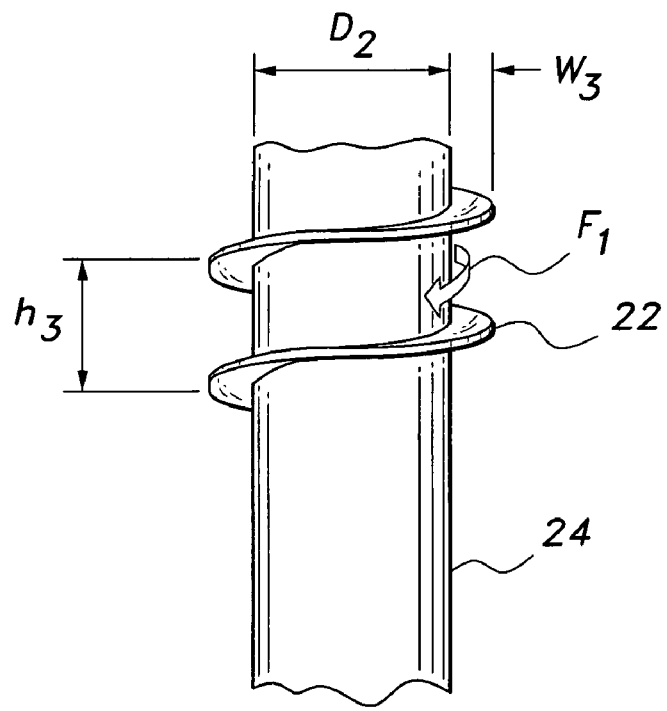
FIG. 3 is a partial side view of a helical vane mounted to a cylindrical shell of the induced vortex particle separator according to the present invention.

An inner cylindrical shell 24 having a diameter $D_2$ associated therewith, which is less than the diameter $D_1$ of the substantially cylindrical sidewall of the housing 14, is mounted to the closed upper end 15 of the housing 14 and is positioned coaxially therewith. The inner cylindrical shell 24 extends between the closed upper end 15 and the central region 26 of the housing 14, as shown in FIG. 1. As shown in FIGS. 1 and 3, a helical vane 22 is mounted to an outer surface of the inner cylindrical shell 24 and an inner surface of the substantially cylindrical sidewall, with the helical vane 22 extending therebetween. The particular contouring of the helical vane 22 will be described in detail below.

Figure 5:
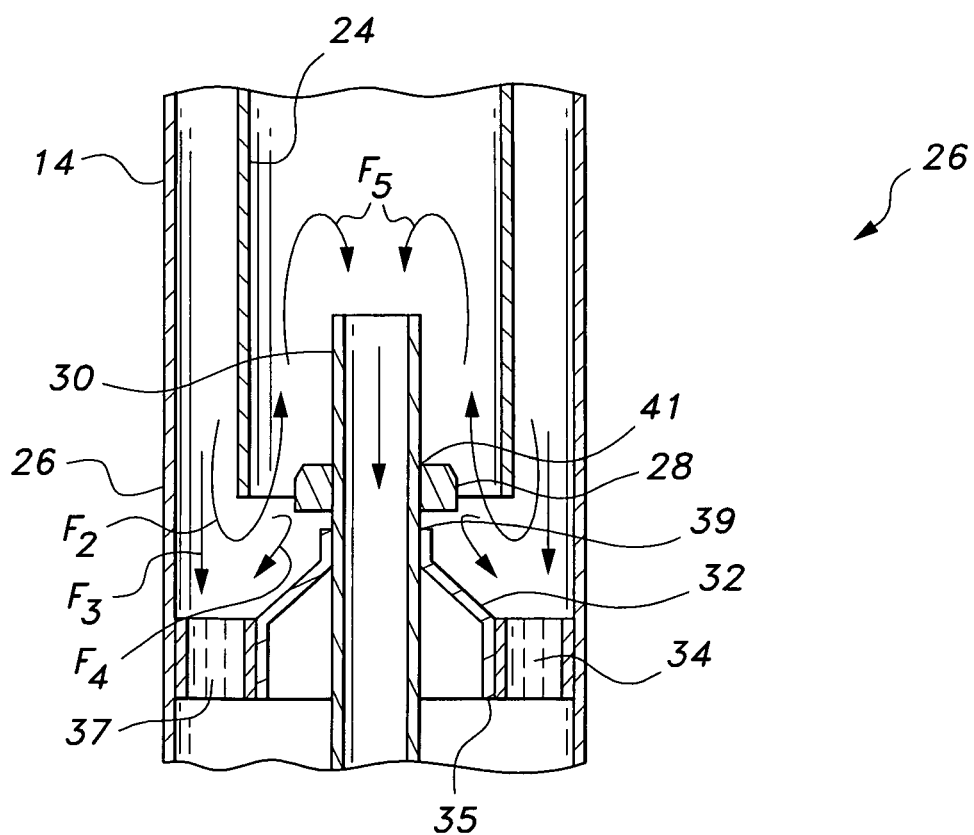
FIG. 5 is a partial side view in section of a central region of the induced vortex particle separator according to the present invention.

As best shown in FIGS. 1 and 5, an annular stator 34 is mounted to the inner surface of the substantially cylindrical sidewall within the central region 26 of the housing 14, with the annular stator 34 defining a central opening 35, and having at least one flow passage 37 defined therethrough. An inverted diffuser cone 32 is mounted within the central opening 35 of the annular stator 34 and extends upwardly therefrom. The inverted diffuser cone 32 has a central passage 39 formed therethrough.

Further, a siphon nozzle 30 having an open upper end, an open lower end, and a central portion is provided, with the central portion thereof being received within the central passage 39 of the inverted diffuser cone 32 such that the open upper end of the siphon nozzle 30 is positioned within a lower end of the inner cylindrical shell 24. The open lower end of the siphon nozzle 30 is joined to the outlet port 19 of the housing 14, as shown in FIG. 1. Siphon nozzle 30 preferably has a length between approximately $0.5D_1$ and $1.5D_1$ in order to generate a proper pressure differential, as will be described in detail below.

Figure 4:
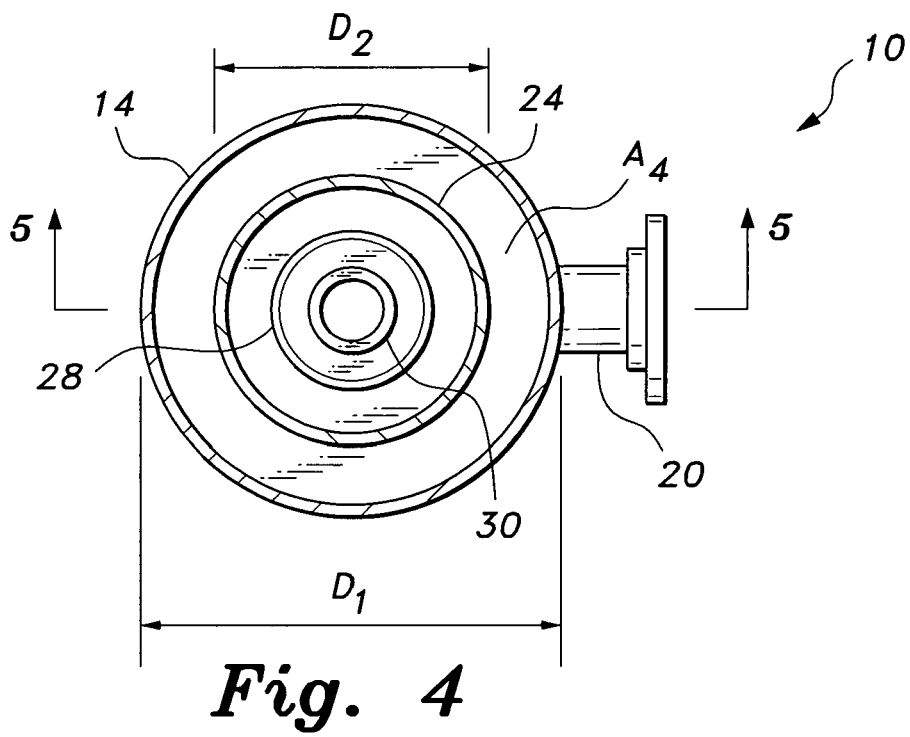
FIG. 4 is a diagrammatic section view taken along lines 4-4 of FIG. 1.

A collector ring 28 having a central passage 41 formed therethrough is mounted to the siphon nozzle 30 with the siphon nozzle 30 projecting through the central passage 41. The collector ring 28 is mounted above the inverted diffuser cone 32. As will be described in detail below, fluid flows along flow path $F_2$ between collector ring 28 and inner cylindrical shell 24. The fluid flows through a region having a cross-sectional area of $A_4$ (best shown in FIG. 4), which preferably is between approximately 0.5 and 1.5 times the cross-sectional area of the helical flow path $A_3$ (to be described below in greater detail). The area $A_4$ is determined by the physical characteristics of the fluid in order to generate the proper pressure differential for generating flow path $F_2$.

In operation, liquid containing particulate matter is input into the induced vortex particle separator 10 through the inlet nozzle 12. Input liquid is shown by directional flow arrow I in FIGS. 1 and 2. The liquid is induced into a helical flow path $F_1$ by the helical vane 22 (within upper region 16). Upon exiting upper region 16 and entering central portion 26 (best shown in FIG. 5), a free vortex is formed between the annular stator 34, an outer surface of the inverted diffuser cone 32, a lower end of the inner cylindrical shell 24, a lower surface of the collector ring 28 and the inner surface of the substantially cylindrical sidewall of housing 14. Within the free vortex formed in the liquid, particulate matter is separated from the liquid under centrifugal force.

Relatively high density particulate matter achieves the greatest diameter in the vortex path and settles adjacent the inner surface of the housing 14. The high density particulate matter falls towards stator 34 and through passage 37 under the force of gravity (shown by directional flow line $F_3$ in FIG. 5). Particulate matter having a lower density is deflected by the outer surface of the inverted diffuser cone 32, and also passes through the at least one flow passage 37 of the annular stator 34, under the force of gravity (shown by directional flow line $F_4$). The annular stator 34 preferably includes fixed vertical vanes, which prevent any unwanted angular momentum remaining in the particulate matter.

The particulate matter (and some liquid) collects within the lower region 18 of the housing 14 for later retrieval and disposal thereof. The remaining liquid flows into the lower end of the inner cylindrical shell 24 due to the fluid pressure in this region being less than that within the outer and lower free vortex region (shown by directional flow arrow $F_2$), and then passes into the siphon nozzle 30 (shown by directional flow arrow $F_5$) to be selectively expelled through the outlet port 19 and nozzle 20. Some fine particulate matter may travel along flow path $F_2$ with the liquid. These particles, however, fall, under the force of gravity, from the liquid to collect on the upper surface of collector ring 28, which forms a receiving shelf. The flow into the siphon nozzle along $F_5$ is a substantially liquid-only flow.

In the above, the liquid flow is typically incompressible fluid flow governed by the constant flow equation $Q=UA$, where Q is flow in cubic feet per second (cfs), U is fluid velocity in feet per second (ft./sec.), and A is the cross-sectional area in square feet (ft.$^2$) of liquid pathway. Flow I, entering the system, preferably has a velocity of between approximately 7.5 ft./sec. and 15 ft./sec.

The flow rate Q remains substantially constant throughout the process so that the mean velocity of the fluid $U_m$ within upper section 16 can be expressed as $$U_m = U_1 \cdot \frac{A_1}{A_3} = U_1 \cdot \frac{\pi(d_1)^2/4}{w_1 h_3},$$

where $U_1$ is the initial velocity of input flow I, $A_1$ is the cross-sectional area of nozzle 12, $A_3$ is the cross-sectional area of the pathway defined between adjacent walls of helical vane 22, $d_1$ is the diameter of nozzle 12, $w_1$ is the width of flow through vane 22, and $h_3$ is the height of flow through vane 22.

When the fluid exits the upper region 16 and enters the central region 26, to form the free vortex, the angular momentum of the fluid remains substantially constant, but the fluid streamlines become undefined. Particulate matter with a density greater than the liquid migrates to the inner wall of the housing 14, and moves downward towards the stator 34, both under the force of gravity and further due to the fluids downward momentum (from the helical pathway of region 16).

Due to the geometry of central region 26, the fluid flow streamlines remain concentric, but the particulate matter ceases to rotate about the central axis because the centripetal force, created by the helical vane 22 and the inner wall of the housing, is no longer present.

The free vortex is similar to natural vortices formed due to the Coriolis Effect. In a forced vortex (such as that driven by vane 22), the tangential velocity of the fluid is given by $U_\theta = \omega \cdot r$, where $\omega$ is the angular velocity of the fluid and $r$ is the mean radius of flow. In a free or Coriolis-type vortex, the tangential velocity is given by $$U_\theta = \frac{\Gamma}{2\pi r},$$

where $\Gamma$ is the fluid dynamic circulation. The circulation for a generalized fluid having a fluid velocity of $\vec{V}$ about a closed path C is given by $$\Gamma = \oint_C \vec{V} \cdot d\vec{s}.$$

In the expression for $U_\theta$, we see that tangential velocity increases as radius decreases. Thus, the pressure decreases as the radius decreases, causing the flow $F_2$ of FIG. 5.

Helical vane 22 may have any desired length or contour, though in the preferred embodiment, helical vane 22 only completes two full revolutions about the inner shell 24, and has a pitch angle $\alpha$ defined by $$\alpha = \frac{N}{\pi},$$

where N is the number of revolutions per mean diameter. The mean diameter is expressed in terms of the diameter of the housing 14 $D_1$ and the diameter of the inner cylindrical shell 24 $D_2$:

$$D_m = D_2 + \frac{D_1 - D_2}{2}.$$

Preferably, the height of the helical flow path $h_3$ is $$\frac{D_m}{N}$$

and the width $w_1$ is simply given by $$\frac{D_1 - D_2}{2}.$$

Preferably, a sludge drainage port 51 is formed through the closed lower end 17 of the housing 14, and a drainage nozzle 40 is mounted to an exterior surface of the housing 14, with the drainage nozzle 40 covering and selectively sealing the sludge drainage port 51. A secondary annular stator 36 may be mounted to the inner surface of the substantially cylindrical sidewall, within the lower region of the housing 14. A secondary cone 38 is mounted within the stator 36, similar to the primary stator and diffuser cone described above.

The secondary stator 36 preferably includes vertical vanes, similar to the primary stator, for preventing unwanted angular flow of the particulate matter and remaining liquid, which forms a sludge. The cone 38 is provided for directing solids into the liquefied sludge region 18.

It is to be understood that the present invention is not limited to the embodiments described above, but encompasses any and all embodiments within the scope of the following claims.

We claim:

1. An induced vortex particle separator, comprising:
a housing having a substantially cylindrical sidewall and closed upper and lower ends, the housing having an upper region, a central region and a lower region;
an inlet port formed through the upper region of the housing;
an outlet port formed through the lower region of the housing;
an inner cylindrical shell having a diameter less than a diameter of the substantially cylindrical sidewall of the housing, the inner cylindrical shell being mounted to the closed upper end of the housing and being positioned coaxially therewith, the inner cylindrical shell extending between the closed upper end and the central region of the housing;
a helical vane mounted to an outer surface of the inner cylindrical shell and an inner surface of the substantially cylindrical sidewall, the helical vane extending therebetween;
an annular stator mounted to the inner surface of the substantially cylindrical sidewall within the central region of the housing, the annular stator defining a central opening, the annular stator having at least one flow passage defined therethrough;
an inverted diffuser cone mounted within the central opening of the annular stator and extending upwardly therefrom, the inverted diffuser cone having a central passage formed therethrough;
a siphon nozzle having an open upper end, an open lower end, and a central portion, the central portion being received within the central passage of the inverted diffuser cone so that the open upper end of the siphon nozzle is positioned within a lower end of the inner cylindrical shell, the open lower end being joined to the outlet port of the housing; and
a collector ring having a central passage formed therethrough, the collector ring being mounted to the siphon nozzle with the siphon nozzle projecting through the central passage, the collector ring being mounted above the inverted diffuser cone, the collector ring having an upper surface adapted for receiving fine particulate matter separated from a liquid containing particulate matter.

2. The induced vortex particle separator as recited in claim 1, wherein the closed lower end of said housing has a sludge drainage port formed therein.

3. The induced vortex particle separator as recited in claim 2, further comprising a drainage nozzle mounted on the housing, the drainage nozzle covering and selectively sealing the sludge drainage port.

4. The induced vortex particle separator as recited in claim 1, further comprising an inlet nozzle mounted to an exterior surface of the housing, the inlet nozzle covering and selectively sealing the inlet port.

5. The induced vortex particle separator as recited in claim 4, further comprising an outlet nozzle mounted to the exterior surface of the housing, the outlet nozzle covering and selectively sealing the outlet port.

6. The induced vortex particle separator as recited in claim 1, further comprising a secondary annular stator mounted on the inner surface of the substantially cylindrical sidewall within the lower region of the housing.

7. The induced vortex particle separator as recited in claim 6, further comprising a secondary diffuser cone mounted within a central opening formed through the secondary annular stator.

8. The induced vortex particle separator as recited in claim 1, wherein the housing has a height at least six times the diameter of the substantially cylindrical sidewall.

9. The induced vortex particle separator as recited in claim 8, wherein the outlet port is positioned at least four times the diameter of the substantially cylindrical sidewall from the closed upper end of the housing.

10. The induced vortex particle separator as recited in claim 9, wherein said siphon nozzle has a length between approximately one-half and approximately one and one-half times the diameter of the substantially cylindrical sidewall.

11. The induced vortex particle separator as recited in claim 10, wherein the perimeter of the collector ring and the inner cylindrical shell define a cross-sectional area between approximately one-half and one and one-half times a cross-sectional area defined by a height between adjacent portions of the helical vane and a radial distance between the substantially cylindrical sidewall and the inner cylindrical shell.

12. The induced vortex particle separator as recited in claim 11, wherein the helical vane extends for two revolutions about the inner cylindrical shell.

13. The induced vortex particle separator as recited in claim 1, wherein the at least one flow passage formed through the annular stator is an annular passage.

14. The induced vortex particle separator as recited in claim 1, wherein the collector ring is substantially circular in cross section.

15. The induced vortex particle separator as recited in claim 1, wherein the siphon nozzle is substantially L-shaped.

16. The induced vortex particle separator as recited in claim 1, wherein the upper end of the siphon nozzle is positioned coaxially with the housing.

* * * * *